United States Patent [19]

Bethune et al.

[11] Patent Number: 5,424,054
[45] Date of Patent: Jun. 13, 1995

[54] CARBON FIBERS AND METHOD FOR THEIR PRODUCTION

[75] Inventors: Donald S. Bethune; Robert B. Beyers; Ching-Hwa Kiang, all of San Jose, Calif.

[73] Assignee: International Business Machines Corporation, Armonk, N.Y.

[21] Appl. No.: 65,821

[22] Filed: May 21, 1993

[51] Int. Cl.$^6$ ............................................. D01F 9/12
[52] U.S. Cl. .............................. 423/447.2; 423/447.3
[58] Field of Search ............... 423/447.3, 447.2, 445 B

[56] References Cited

U.S. PATENT DOCUMENTS

4,663,230  5/1987  Tennent ............................. 428/367
5,102,647  4/1992  Yamada et al. .................. 423/447.3

OTHER PUBLICATIONS

Iijima, "Helical microtubules of graphitic carbon", Nature, vol. 354, Nov. 7, 1991.
P. M. Ajayan et al., "Smallest carbon nanotube", Nature, vol. 258, Jul. 2, 1992.
Iijima et al., "Pentagons, heptagons and negative curvature in graphite microtuble growth", Nature vol. 356, Apr. 30, 1992.
Endo, "Grow carbon fibers in the vapor phase", Chemtech, Sep. 1988.
Ajayan et al., "Opening carbon nantubes with oxygen and implictions for filling", Nature, vol. 362, Apr. 8, 1993.
Tsang et al., "Thinning and opening of carbon nanotubes by oxidation using carbon dioxide", Nature, vol. 362, Apr. 8, 1993.
Wang et al., "Growth and characterization of buckybundles", Appl. Phys. Lett. 62 (16), Apr. 19, 1993.
Jose-Yacaman et al., "Catalytic growth of carbon microtubles with fullerene structure", Appl. Phys. Lett 62 (6), Feb. 8, 1993.
Ugarte, "Morphology and structure of graphitic soot particles generated in arc-discharge C$_{60}$ production", Chemical Physics Letters, vol. 198, No. 6, Oct. 23, 1992.
Charlier et al., "Energetics of Multilayered Carbon Tubles", The American Physical Society, Physical Review Letters, vol. 70, No. 12, Mar. 22, 1993.
Ebbesen et al., "Large-scale synthesis of carbon nanotubes", Nature, vol. 358, Jul. 16, 1992.
Endo et al., "Formation of Carbon Nanofibers", J. Phys. Chem. 1992, 96, 6941–6944.
Dravid et al., "Buckytubes and Derivatives: Their Growth and Implications for Buckyball Formation", Science, vol. 259, Mar. 12, 1993.
Saito et al., "Growth and structure of graphitic tubules and polyhedral particles in arc–discharge", Chemical Physics Letters, vol. 204, No. 3, 4, Mar. 19, 1993.
Pederson et al., "Nanocapillarity in Fullerene Tubules", Physical Review Letters, vol. 69, No. 18, Nov. 2, 1992.
Seraphin et al, "Yttrium Carbide in nanotubes", Nature, vol. 362, Apr. 8, 1993.
Ajayan et al., "Capillarity–induced filling of carbon nanotubes", Nature, vol. 361, No. 6410, Jan. 28, 1993.
Ge et al., "How to grow buckytubes", Science, vol. 260, Apr. 23, 1993.
Ajayan et al, "Smallest carbon nanotube", Nature, vol. 358, Jul. 2, 1992.
Ando et al., "Preparation of Carbon nanotubes by Arc–Discharge Evaporation", Jpn. Appl. Phys. 32 (Jan. 1993), Pt. 2, No. 1A/B.
Oberlin et al., "Filamentous Growth of Carbon through Benzene Decomposition", Journal of Crystal Growth, 32 (1976) 335–349 no month.
Walker et al., "Chemistry and Physics of Carbon", Department of Material Sciences and Engineering, University Park, Pa., vol. 14 no date.
Iijima et al., "Pentagons, heptagons and negative curvature in graphite microtubule growth", Nature, vol. 356, Apr. 30, 1992.

(List continued on next page.)

Primary Examiner—Michael Lewis
Assistant Examiner—Stuart L. Hendrickson
Attorney, Agent, or Firm—Robert B. Martin

[57] ABSTRACT

The present invention relates to hollow carbon fibers having a cylindrical wall comprising a single layer of carbon atoms and a process for the production of these fibers.

3 Claims, 4 Drawing Sheets

OTHER PUBLICATIONS

Ugarte, "Curling and closure of graphitic networks under electron-beam irradiation", Nature, vol. 359, Oct. 22, 1992.

Lambin et al., "On the Energetics of Tubular Fullerenes", Institute for Research in Interface Sciences, Facultes N.-D. de la Paix, 61 rue de Bruxelles, B-5000 Namur, Belgium (no date).

Iijima, et al., "Growth Model for Carbon Nanotubes", vol. 69, No. 21, Physical Review Letters, Nov. 23, 1992.

Bethune et al., "Cobalt Catalyzed Growth of Single-Walled Carbon Nanotubes", IBM Research Division, Almaden Reserch Center 650 Harry Road, San Jose, Calif. 15120-6099 (no date).

I. Peterson, "Wrapping carbon into superstrong tubes", Science Views, vol. 143, 1993 (no month).

Baum, R, "Carbon nanotubes opened by oxidation", Apr. 12, 1993 C & EN.

F. Flam, "Condensed Matter Physicists Shrink Their Horizons", Science, vol. 260, Apr. 9, 1993.

W. Kratschmer et al., "Solid $C_{60}$: a new form of carbon", Nature, vol. 347, Sep. 27, 1990.

W. Kratschmer et al., "The infrared and ultraviolet absorption spectra of laboratory-produced carbon dust: evidence for the presence of the $C_{60}$ molecule", Chemical Physics Letters, vol. 170, No. 2.3, Jul. 6, 1990.

Bacon, "Growth, Structure, and Properties of Graphite Whiskers", Journal of Applied Physics, vol. 31, No. 2, Feb. 1960.

Kato et al., "Process of formation of vapour-grown carbon fibres by gas-phase reaction using ultrafine iron catalyst particles", Journal of Materials Science Letters 11 (1992) 674–677 (no month).

Baker, "Catalytic Growth of Carbon Filaments", Carbon, vol. 27 No. 3, pp. 315–323, 1989 (no month).

Shinohara et al., "Encapsulation of a scandium trimer in $C_{82}$", Nature, vol. 357, May 7, 1992.

Johnson et al., "Electron paramagnetic resonance studies of lanthanum-containing $C_{82}$", Nature, vol. 355, Jan. 16, 1992.

Yannoni et al., "Scandium Clusters in Fullerene Cages", Science, vol. 256, May 22, 1992, Ajayan et al., "Distribution of pertagons and shapes in carbon nano-tubes and nano-particles", Chem. Phys. Lett., vol. 202 No. 5 Jan. 29, 1993.

CARBON FIBERS AND METHOD FOR THEIR PRODUCTION

FIELD OF THE INVENTION

The present invention relates to hollow carbon fibers having a cylindrical wall comprising a single layer of carbon atoms and a process for the production of these fibers.

BACKGROUND OF THE INVENTION

Carbon fibers have found wide application as constituents of composite materials such as reinforced polymers and metals. Carbon fibers provide such composites with improved properties such as greater strength, higher electrical and thermal conductivity and toughness. Polymeric composites with carbon fibers are used to make parts for automobiles, airplanes, parts for electromagnetic shielding or for support for catalytic particles.

Several methods are known in the art for producing carbon fibers. A first method involves dehydrogenating and graphitizing organic polymer filaments by heating them in a suitable atmosphere to make continuous carbon fibers with diameters typically between 1 and 5 $\mu$m.

A second method involves producing discontinuous carbon fiber segments by vaporizing a hydrocarbon and then with a carrier gas contacting the hydrocarbon vapor with a suitable metal catalyst. This type of carbon fiber is known as "vapor grown carbon fiber" or VGCF. Typical VGCF consists of fibers a few $\mu$m in diameter with lengths ranging from a few microns to several centimeters. The catalyst can be either particulate or can be produced in the gas phase by decomposition of a suitable metal-containing precursor.

Baker and Harris in Chemistry and Physics of Carbon, Vol. 14, page 83 (1978) disclose forming VGCF carbon filaments by contacting ethylene or benzene vapor with cobalt at 1000° K. However, these filaments have large diameters generally greater than 5 nm.

U.S. Pat. No. 4,663,230 discloses contacting a vapor such as benzene, ethylene, acetone, carbon monoxide or the like with a metal-containing particle (e.g. iron, cobalt or nickel) at an elevated temperature to form carbon fibers having a diameter of 3.5 to 70 nm.

Oberlin et al., in the J. of Crystal Growth, 32, p. 335 (1976) discloses a two step process for making carbon fibers. The first step involves pyrolysing a mixture of benzene and hydrogen at 1100° C. to form primary carbon filaments having parallel carbon layers and then the second step involves depositing carbon on these filaments to thicken the filaments.

Carbon fibers comprising a small number of nested carbon tubes will have remarkable properties. Such fibers will have very high strength by virtue of the nature and regularity of their bonding and therefore will provide superior properties to composite materials. They can serve as catalytic surfaces that would confine species in an effectively 1-dimensional space. Arrays of such fibers might be used as filters or sieves. Iijima, in Nature 354, 56 (1991) shows such carbon fibers (nanotubes) with multiple concentric cylindrical shells of hexagonally bonded carbon atoms which are produced in the cathode deposit of a carbon arc generator run with a helium atmosphere of a few hundred Torr. These nanotube fibers have typical outside diameters greater than 2 to several tens of nm.

A still more desirable fiber is a fiber with a wall comprising a single layer or carbon atoms. These single atomic layer fibers could be used to assemble structures with low density and high surface to volume ratios, wires with extremely small diameters and solids with highly anisotropic properties. They also could be semiconducting or metallic depending on their helicity. These single atomic layer fibers could be used directly in assemblies or structures, or could serve as uniform "seed" substrates for growth of larger ordered structures.

Ajayan et at., in Nature, 358, 23 (Jul. 2, 1992) discloses a transmission electron microscope image which the authors speculate is an end-on view of a single isolated structure. However, the process method utilized by the authors does not result in carbon fibers having a wall comprising a single layer of carbon atoms.

Tsang et al., in Nature 362, 520 (Apr. 8, 1993) discloses forming a multilayered carbon fiber having a short end stub comprising a single layer of carbon atoms. Tsang formed this singular fiber by selectively oxidizing a great number of multilayered carbon fibers. Due to the oxidative nature of the process which simultaneously oxidizes both the circumference and the end of the fiber (e.g. the cap), this process is limited to forming a short single atom layer stubs on the end of multilayered fibers.

Therefore, there still is a need in the art for carbon fibers having a wall comprising a single layer of carbon atoms and a process for production of such carbon fibers.

It is therefore an object of the present invention to provide a carbon fiber having a wall comprising a single layer of carbon atoms.

It is another object of the present invention to provide a carbon fiber having a wall comprising a single layer of carbon atoms and a length greater than 100 nm.

It is another object of the present invention to provide a process for the production of carbon fibers having a wall comprising a single layer of carbon atoms.

Other objects and advantages will become apparent from the following disclosure.

SUMMARY OF THE INVENTION

The present invention relates to carbon fibers having a wall comprising a single layer of carbon atoms. The present invention also relates to a process for making carbon fibers having a wall comprising a single layer of carbon atoms. The process involves contacting carbon vapor with cobalt. Preferably, the carbon vapor is produced by electric-arc heating. Preferably, the cobalt is also vaporized preferably by electric-arc heating. Preferably, the process is carried out in an inert atmosphere.

A more thorough disclosure of the present invention is presented in the detailed description which follows and the accompanying drawings.

DETAILED DESCRIPTION OF THE INVENTION

Figure 1:
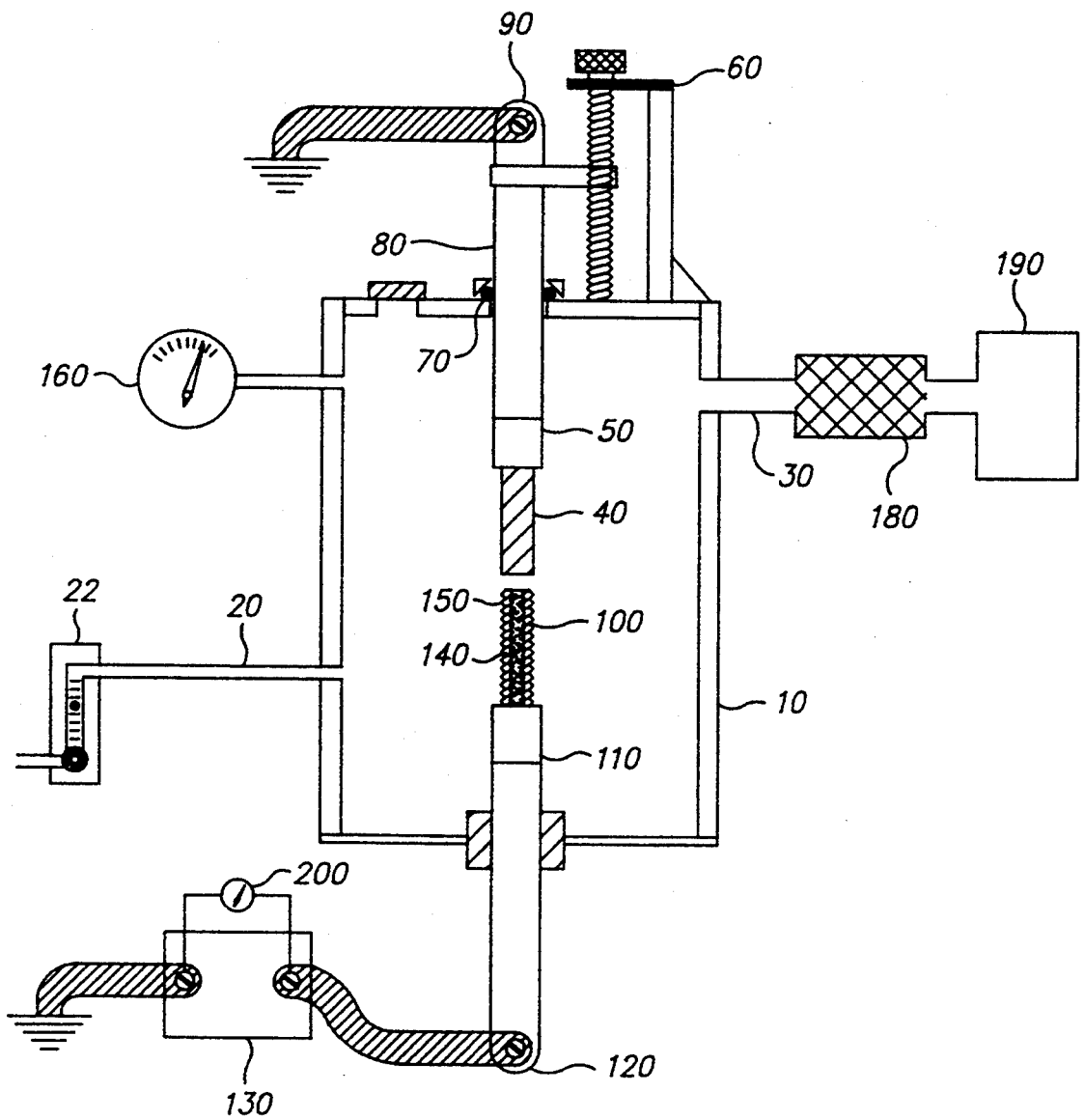
FIG. 1 is a schematic view of an apparatus useful for the process of the present invention.

The present invention relates to carbon fibers having a wall comprising a single layer of carbon atoms. The present invention also relates to a process for making carbon fibers (tubes) having a wall comprising a single layer of carbon atoms. The process comprises contacting carbon vapor and cobalt vapor and recovering the product under conditions effective to produce the fiber as described below:

The process of the present invention involves contacting carbon vapor with cobalt, preferably cobalt vapor, preferably in an inert atmosphere. As used herein carbon vapor shall mean a gas of carbon atoms, ions or clusters. The carbon vapor can be conveniently produced by thermally vaporizing solid carbon. Suitable forms of solid carbon are amorphous carbon, graphite, activated or decolorizing carbon or mixtures thereof. The solid carbon can be vaporized by heating carbon using a variety of heating techniques such as electric arc heating, RF induction heating, laser heating, electron beam heating, RF plasma heating or plasma-spray heating. Other heating techniques will be known by those skilled in the art. Preferably, the solid carbon is vaporized by electric-arc heating. Preferably, solid carbon in the form of a graphite rod is used as one of the two electrodes used in electric-arc heating.

In a preferred embodiment of the process of the present invention, the cobalt is also vaporized. Suitable forms of cobalt for use in the process are pure cobalt, cobalt compounds or cobalt alloys. Suitable cobalt compounds include cobalt oxide. Other cobalt compounds such as cobalt carbonates, cobalt carbide and others may also be used. Cobalt alloys preferably are transition metal alloys such as cobalt/nickel or the like. Suitably, a hollowed-out graphite rod is filled with a mixture of cobalt containing powder and graphite to form the second electrode for the electric-arc heater.

The carbon vapor is preferably formed in an inert atmosphere such as helium, argon or neon. The atmosphere may contain minor amounts of other gases such as hydrogen, oxygen, nitrogen or water provided such gases do not unacceptably interfere with the process of the present invention.

Conveniently, the carbon rod and the carbon/cobalt rod are electric-arc heated in an inert atmosphere. Conveniently, an electrical potential (generally about 15 to 30 volts with current of about 90–120 amps) is established between the first electrode (carbon rod) and the second electrode (carbon/cobalt rod) to heat the rods to a high temperature (e.g. about 2800° C. or greater). Suitably, the rods are heated in a chamber which is partially evacuated and contains an inert atmosphere of helium, argon or neon, preferably at a pressure of about 100 torr to 3000 torr, more preferably about 500 torr. The rods are vaporized at a rate of about 2 to 10 mm/min. The arc heating of the rod results in the formation of both carbon vapor and cobalt vapor.

In a batch process, the product carbon fibers are condensed on the walls of the reaction chamber and are readily recovered by vacuuming. The fibers can be purified by conventional methods such as solvent extraction. In an alternative process embodiment, a flow tube reactor could be utilized with continuously flowing inert gas to transport the product carbon fiber out of the reaction zone. Suitably, a plasma torch could be utilized as the heating device for vaporizing the carbon and cobalt compounds entering the flow tube reactor.

The carbon fibers of the present invention have a wall comprising a single atomic layer of carbon atoms. The thickness of the wall of the fiber is a single carbon atom thick and the carbon atoms of the wall are bonded together. The fiber is hollow and the wall is optimally cylindrically shaped and has a cross-sectional diameter generally less than about 3.5 nm preferably less than about 2 nm and more preferably less than about 1.5 nm; preferably a diameter of about 1 nm to about 2 nm. The fibers generally have a length greater than about 50 nm preferably greater than 100 nm, most preferably greater than about 1000 nm. The carbon fibers of the present invention can be utilized to form polymeric, metallic, ceramic and glass composites. Suitable polymers for such polymeric composites include epoxy polymers, polyetheretherketones, polystyrene polymerized in the presence of polyesters and elastomers such as polybutadiene.

Referring to FIG. 1, there is shown an apparatus suitable for producing single atomic layer carbon fiber in accordance with the process of the present invention comprising a water-cooled chamber 10, a gas inlet 20 for inert gas with flow meter 22, and a gas outlet 30 for evacuation of the chamber and for dynamically maintaining the chamber pressure. A carbon rod cathode 40 is held in a water cooled holder 50 that may be advanced or retracted by a drive mechanism 60. An o-ring 70 is used to seal between the chamber and the moveable electrode holder shaft 80. An electrical connection 90 is made to the electrode holder to maintain it at ground potential. An anode 100 is held in a water cooled holder 110 that is insulated from the chamber and has an electrical connection 120 to the power supply 130. The anode is hollowed out and a mixture of graphite and cobalt powders 140 is packed into the anode and retained with a short piece of threaded graphite rod 150. After evacuating and flushing the chamber with helium several times, the chamber pressure is set between 200 and 500 Torr helium pressure with a flow of 10 torr liters/sec. A pressure gauge 160 and a flowmeter 22 are used to monitor these conditions. A filter 180 prevents solid products from being drawn into the pump 190. An electric arc is established by bringing the anode and cathode into contact and then separating them by a short distance e.g. approximately 1 mm. The voltage across the electrodes and the gap is monitored with a voltmeter 200.

The following example is a detailed description of the process of the present invention. The detailed description falls within the scope of, and serves to exemplify, the more generally described process set forth above. The example is presented for illustrative purposes only, and is not intended as a restriction on the scope of the invention.

EXAMPLE

Figure 2:
FIG. 2 is a low magnification transmission electron microscope micrograph of the product of the process of the present invention.

The apparatus shown in FIG. 1 was used with an anode loaded with a mixture of cobalt and graphite powder. The gross percentage of consumed cobalt to consumed carbon was 2% atomic. A current of between 95 and 115 amps DC was set on the power supply and the voltage across the electrodes and gap was maintained between 22 and 28 volts by regulating the gap between the electrodes using the cathode drive mechanism. During operation web-like structures formed in the chamber. These webs drape between various surfaces in the chamber. The soot on the walls had an unusual rubbery character and could be peeled off in long strips (unlike normal fullerene soot, which is crumbly). The soot and the web material are ferromagnetic. The transmission electron microscope (TEM) image of the web material in FIG. 2 shows that the web consists of rounded soot particles a few tens of nm across, linked together by thread-like fibers. Embedded within the soot particles are round cobalt particles with diameters ranging from a few nm to roughly 20 nm. Both electron and X-ray diffraction patterns indicate that these cobalt particles are face-centered-cubic cobalt, indicating rapid quenching, since cobalt is normally hexagonal-close-packed below 400° C. Scanning electron microscope (SEM) images show that the rubbery soot deposits from the chamber walls contain similar thread-like fibers and soot particles like the web material, but with the soot particles in greater relative abundance compared to the web material.

Figure 3:
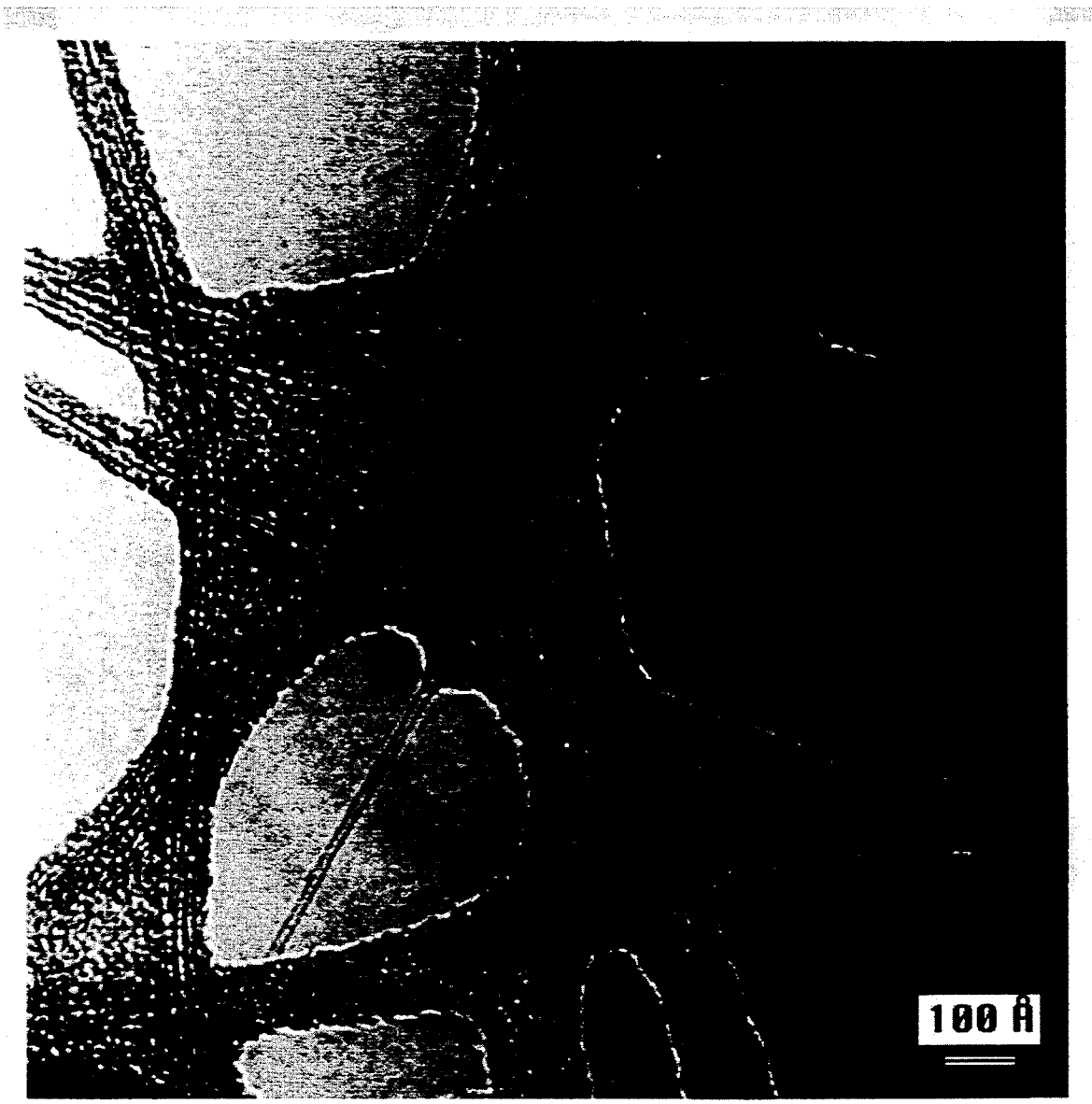
FIG. 3-4 are transmission electron microscope micrographs of the carbon fibers of the present invention.
Figure 4:
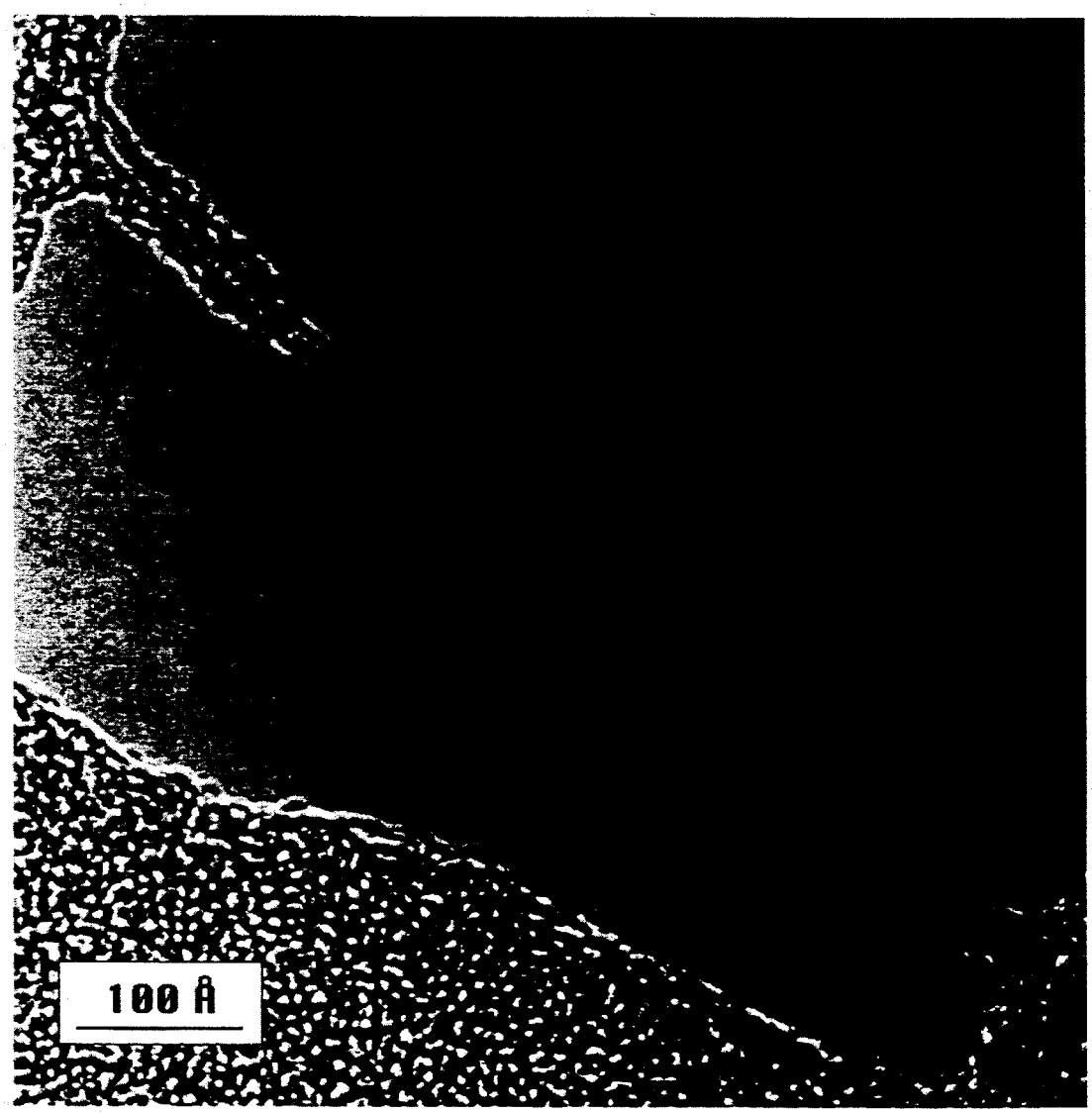

The TEM micrograph in FIG. 3, taken at higher magnification, reveals carbon fibers (shown by the arrows) each having a single-atomic-layer wall with diameters of $1.2\pm0.1$ nm. These single-atomic-layer carbon fibers are ubiquitous within the larger diameter thread-like carbon fibers. The dark spot in the upper-right corner of FIG. 3 is a cobalt particle. The TEM image in FIG. 4 (taken at still higher magnification) shows another single atomic layer carbon fiber of the same diameter, with several round objects comparable in size to fullerenes with 60–100 carbons adhering to it.

Although this invention has been described with respect to specific embodiments, the details thereof are not to be construed as limitation for it will be apparent that various embodiments, changes and modifications may be resorted to without departing from the spirit and scope thereof, and it is understood that such equivalent embodiments are intended to be included within the scope of this invention.

We claim:

1. A process for producing hollow carbon fiber having a wall consisting essentially of a single layer of carbon atoms comprising the step of contacting carbon vapor and recovering the fiber product under conditions effective to produce the hollow fiber with cobalt vapor.

2. The process of claim 1 wherein the carbon vapor and cobalt vapor are formed by electric-arc heating.

3. A hollow carbon fiber having a wall consisting essentially of a single layer of carbon atoms.

* * * * *

UNITED STATES PATENT AND TRADEMARK OFFICE
CERTIFICATE OF CORRECTION

| | | |
|---|---|---|
| PATENT NO. | : 5,424,054 | Page 1 of 1 |
| APPLICATION NO. | : 08/065821 | |
| DATED | : June 13, 1995 | |
| INVENTOR(S) | : Donald S. Bethune, Robert B. Beyers and Ching-Hwa Kiang | |

It is certified that error appears in the above-identified patent and that said Letters Patent is hereby corrected as shown below:

Column 6: lines 4 and 5 of Claim 1, delete

"and recovering the fiber product under conditions effective to produce the hollow fiber"

Column 6: line 6 of Claim 1 after the word "vapor", add

-- and recovering the fiber product under conditions effective to produce the hollow fiber --

Signed and Sealed this

Twentieth Day of February, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 5,424,054 | Page 1 of 1 |
| APPLICATION NO. | : 08/065821 | |
| DATED | : June 13, 1995 | |
| INVENTOR(S) | : Donald S. Bethune, Robert B. Beyers and Ching-Hwa Kiang | |

It is certified that error appears in the above-identified patent and that said Letters Patent is hereby corrected as shown below:

On the title page, amend Item

(73)    Assignees:    International Business Machines Corporation, Armonk, NY
and
California Institute of Technology
Pasadena, CA Signed and Sealed this Twenty-fifth Day of September, 2007

JON W. DUDAS
*Director of the United States Patent and Trademark Office*